(12) United States Patent
Chang

(10) Patent No.: US 7,889,229 B2
(45) Date of Patent: Feb. 15, 2011

(54) SECURITY SURVEILLANCE SYSTEM CAPABLE OF OUTPUTTING STILL IMAGES TOGETHER WITH MOVING IMAGES

(75) Inventor: Myung-Hyun Chang, Cheungju (KR)

(73) Assignee: Toyohide Kashiwayama (JP)

( * ) Notice: Subject to any disclaimer, the term of this patent is extended or adjusted under 35 U.S.C. 154(b) by 1534 days.

(21) Appl. No.: 11/242,088

(22) Filed: Oct. 4, 2005

(65) Prior Publication Data
US 2007/0040909 A1 Feb. 22, 2007

(30) Foreign Application Priority Data
Aug. 16, 2005 (KR) ...................... 10-2005-0074800

(51) Int. Cl.
*H04N 7/18* (2006.01)
(52) U.S. Cl. ........................ 348/143; 348/148; 348/153; 348/159
(58) Field of Classification Search ................. 348/143, 348/148, 153, 159, 169
See application file for complete search history.

(56) References Cited

U.S. PATENT DOCUMENTS
2005/0111660 A1* 5/2005 Hosoda ....................... 380/44

* cited by examiner

*Primary Examiner*—Houshang Safaipour
(74) *Attorney, Agent, or Firm*—Mayer & Williams PC; Stuart H. Mayer, Esq.; Karin L. Williams, Esq.

(57) ABSTRACT

The present invention relates to a security surveillance system. The security surveillance system includes an image acquisition unit, a surveillance image transmission unit, and a surveillance image reception unit. The image acquisition unit acquires captured image signals from a plurality of cameras and outputs them. The surveillance image transmission unit separates the acquired images into moving images and still images, and generates and transmits surveillance images where the still images are separated at predetermined regular intervals. The surveillance image reception unit separately stores the moving images and the still images, reads a still image near a moving image output at a time when a signal requesting the output of the still image is received, and outputs the read still image. Therefore, the system according to the present invention can provide still images together with moving images at the time of the output of images for security surveillance, thus improving the efficiency of security surveillance.

6 Claims, 7 Drawing Sheets

SECURITY SURVEILLANCE SYSTEM CAPABLE OF OUTPUTTING STILL IMAGES TOGETHER WITH MOVING IMAGES

BACKGROUND OF THE INVENTION

1. Field of the Invention

The present invention relates to a security surveillance system.

2. Description of the Related Art

Generally, security surveillance cameras for monitoring persons who enter into or exit from banks and large buildings are located at various places. The security surveillance cameras are connected to the management host of a guard room or a central control room, thus dealing with abnormal situations.

FIG. 1 is a diagram showing the schematic construction of a conventional security surveillance system, and FIG. 2 is a diagram showing the schematic construction of a security surveillance camera used in the system of FIG. 1.

Referring to FIGS. 1 and 2, the conventional security surveillance system includes one or more security surveillance cameras 111 to 114 for compressing (Moving Picture Experts Group (MPEG) encoding) a captured moving image and transmitting the compressed image to a management host 200, and the management host 200 for reproducing and displaying compressed moving images respectively transmitted from the security surveillance cameras 111 to 114. Each of the security surveillance cameras 111 to 114 has a moving image compression unit 121, 122, 123 or 124 which is described in detail below with reference to FIG. 2.

Each of the security surveillance cameras 111 to 114 converts an optical signal, entering through a lens 11, into an electrical signal using an image sensor 12. Thereafter, the electrical signal is converted into a digital signal, and the digital signal is converted into a moving image signal having a predetermined format determined by a digital signal processor 13. Thereafter, the digital moving image signal is encoded and compressed by a moving image compression unit 14, and is transmitted to the management host 200 through an interface 15. Eventually, the management host 200 receives compressed moving images from the security surveillance cameras 111 to 114, respectively, decodes them through decoders 211 to 214 and then displays the decoded moving images on displays 241 to 244. The security surveillance cameras 111 to 114 and the management host 200 are controlled by a control unit 230. If necessary, the moving image data may be stored in memory 220.

A camera unit 100 having the security surveillance cameras 111 to 114 is physically separated from the host 200, so that the moving images are transmitted between the cameras 111 to 114 and the host 200. In the case where the camera unit 100 and the host 200 are connected to each other via the Internet or in some other digital manner, or the management host 200 controls a number of cameras 111 to 114, the management host 200 is connected to a number of cameras 111 to 114, retrieves image data from the cameras 111 to 114, and displays the retrieved image data on the screen or stores them in another recoding medium.

Since it is impossible to simultaneously receive the image data output from many cameras, and store or display them, the cameras compress and transmit the moving images. Such compression decreases the amount of data output from the cameras, so that it facilitates the display of the data on the screen and the storage of the data in another recoding medium.

However, when a moving image is highly compressed, an original screen is distorted or obscured, so that a user cannot clearly view the content of the screen. Accordingly, when using the conventional security surveillance cameras, user can view or determine current situations when the situations occur, but stored images or displayed images are not clear enough to distinguish profiles, thus degrading the security surveillance function.

SUMMARY OF THE INVENTION

Accordingly, the present invention has been made keeping in mind the above problems occurring in the prior art, and an object of the present invention is to provide a security surveillance system which stores high resolution still images between moving image frames in a separate buffer at predetermined intervals and transmits high resolution still images to a management host, thus acquiring the high resolution still images that allow situations to be clearly viewed.

In order to accomplish the above object, the present invention provides a security surveillance system capable of outputting still images together with moving images, including an image acquisition unit for acquiring captured image signals from a plurality of cameras and outputting them; a surveillance image transmission unit for separating the acquired images into moving images and still images, and generating and transmitting surveillance images where the still images are separated at predetermined regular intervals; and a surveillance image reception unit for separately storing the moving images and the still images, reading a still image near a moving image output at a time when a signal requesting the output of the still image is received, and outputting the read still image.

Preferably, the surveillance image transmission unit includes an image reception unit for receiving images from the cameras; a moving image buffer for storing the received moving images; a still image buffer for storing still images at regular intervals; a moving image compression unit for receiving and compressing the moving images stored in the moving image buffer; a still image compression unit for receiving and compressing the still images stored in the still image buffer; a surveillance image generation unit for packetizing the compressed moving images and the compressed still images for transmission; a first interface unit for transmitting packets of the generated surveillance images; and a transmission control unit for controlling the elements for transmitting the surveillance images.

Preferably, the transmission control unit sets the intervals at which the image reception unit separates the still images from the received images, notifies the image reception unit of the set intervals, and controls the image reception unit so as to separate the still images at the set intervals.

Preferably, the image reception unit packetizes the moving images and the still images so that still images are inserted into each of the moving images at the set intervals, and formats the packetized images in conformity with a transmission standard under the control of the transmission control unit.

Preferably, the surveillance image reception unit includes a second interface unit for receiving surveillance images from the surveillance image transmission unit and outputting the received images; a surveillance image separation unit for separating each of the received surveillance images into still images and a moving image; a moving image restoration unit for receiving and restoring the separated moving images; a still image restoration unit for receiving and restoring the separated still images; a moving image storage unit for storing the restored moving images; a still image storage unit for storing the restored still images; a surveillance image output unit for outputting the restored still images and the restored moving images; an input unit for receiving a signal requesting output of the still image; and a reception control unit for controlling the elements so as to selectively output the moving image or the still images in response to the request signal.

Preferably, the reception control unit reads a still image of a frame nearest the moving image currently output from the still image storage unit when the signal requesting output of the still image is input, and outputs the read still image to the surveillance image output unit.

Preferably, the still image has higher resolution than the moving image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
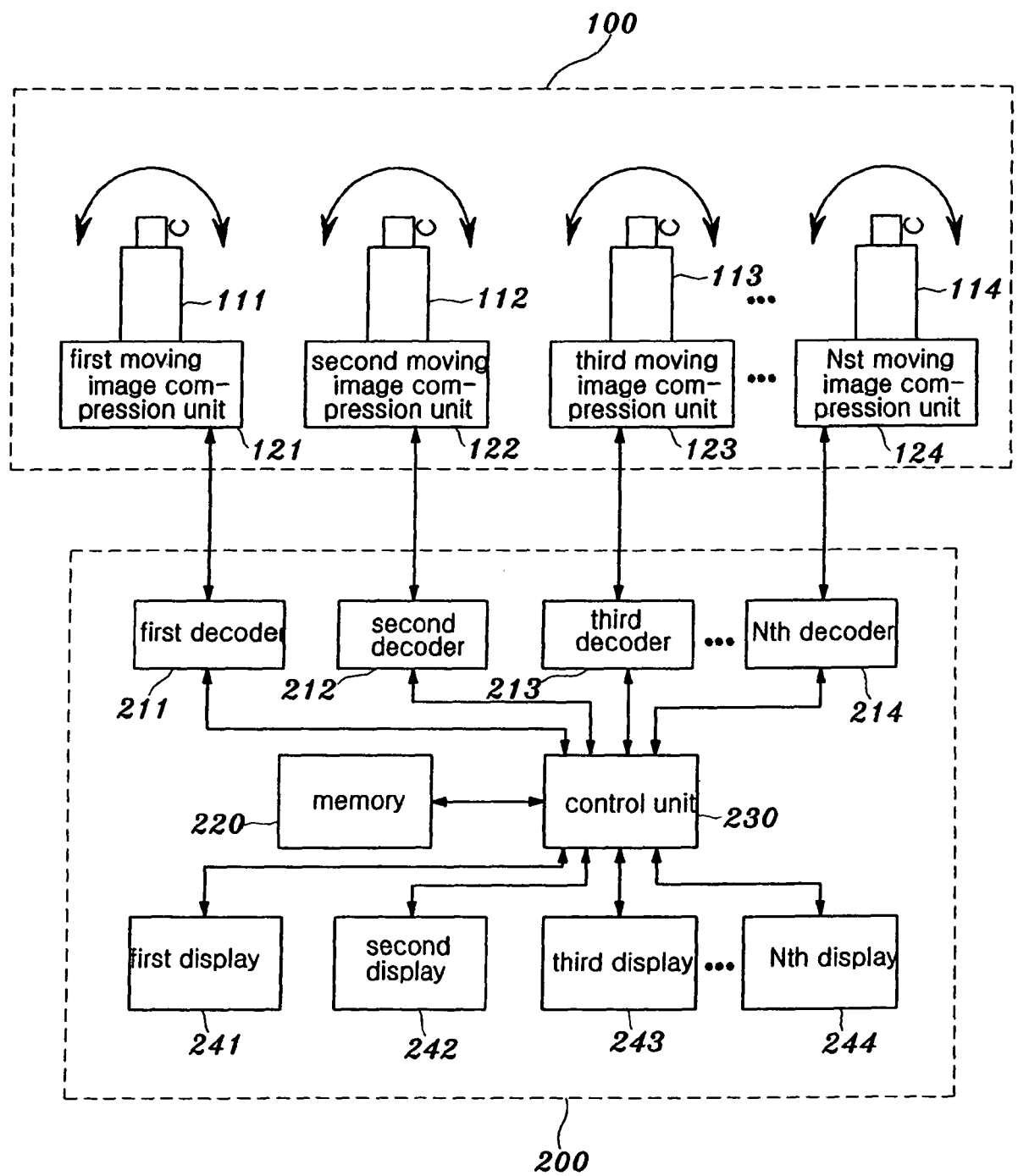
FIG. 1 is a diagram showing the schematic construction of a conventional security surveillance system.
Figure 2:
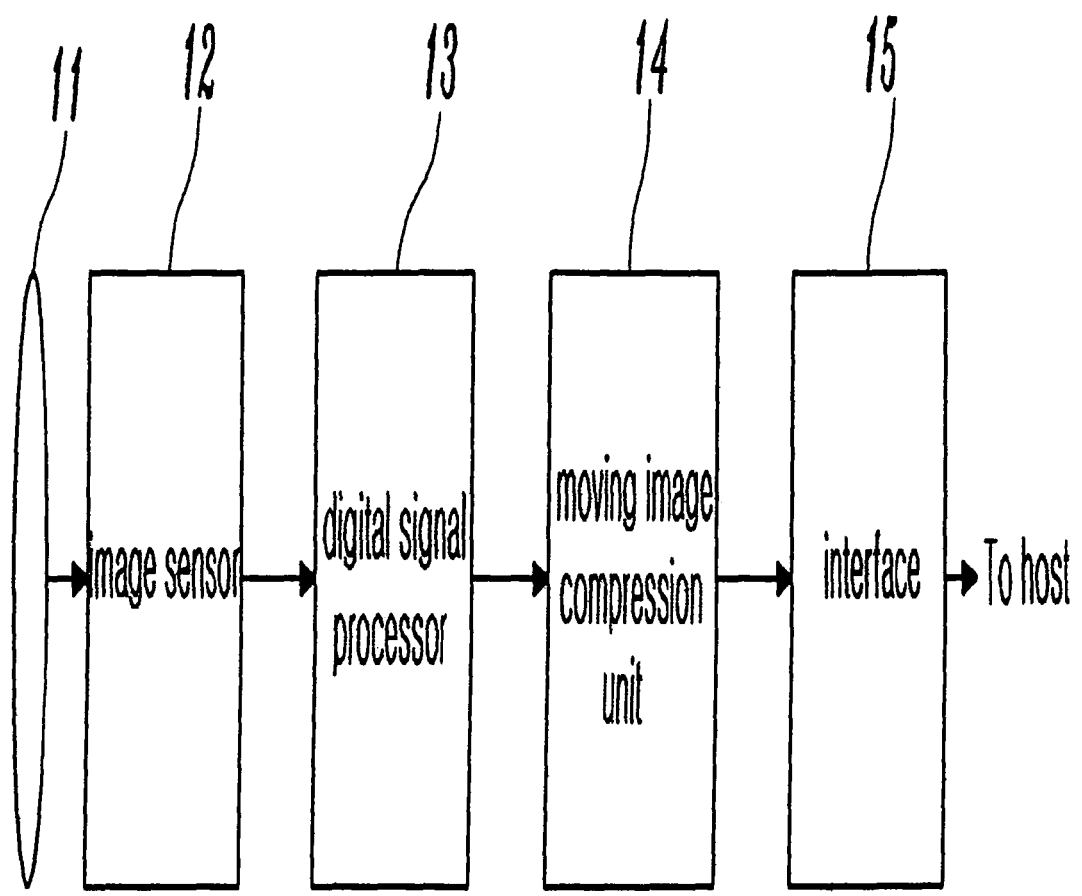
FIG. 2 is a diagram showing the schematic construction of a security surveillance camera used in the system of FIG. 1.

Reference now should be made to the drawings, in which the same reference numerals are used throughout the different drawings to designate the same or similar components.

Preferred embodiments of this invention will be described in further detail with reference to the accompanying FIGS. 3 to 7.

Figure 3:
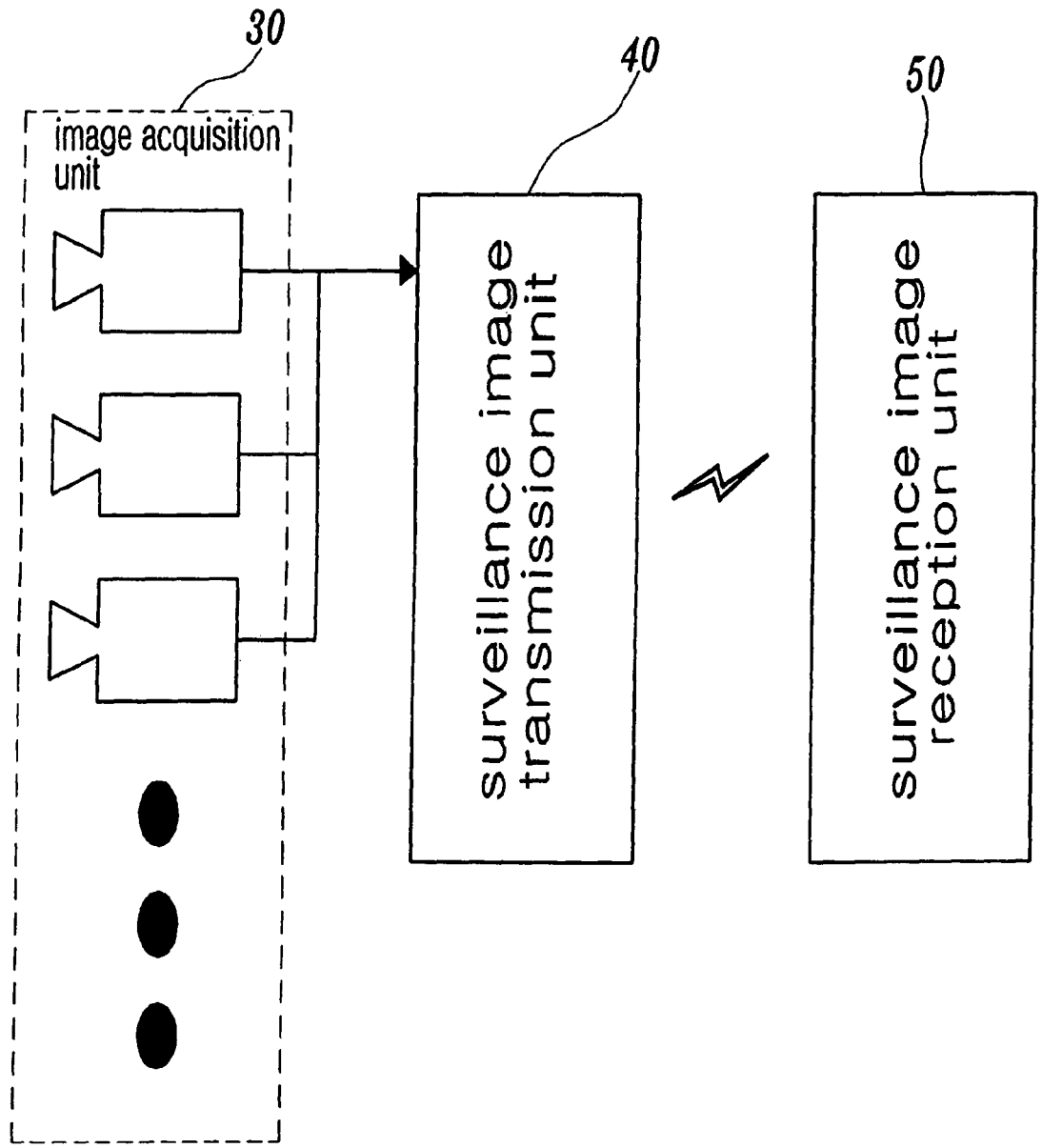
FIG. 3 is a schematic block diagram of a security surveillance system according to an embodiment of the present invention.

FIG. 3 is a schematic block diagram of a security surveillance system according to an embodiment of the present invention.

Referring to FIG. 3, the security surveillance system includes an image acquisition unit 30 for acquiring captured image signals from a plurality of cameras and outputting them, a surveillance image transmission unit 40 for generating the surveillance images from acquired images and transmitting the generated images, and a surveillance image reception unit 50 for receiving and outputting the surveillance images transmitted from the surveillance image transmission unit 40.

In FIG. 3, the surveillance image transmission unit 40 receives image signals from the cameras, separates the image signals into moving images and still images, generates surveillance images through moving image and still image compression processes, and transmits them. Then, the surveillance image reception unit 50 receives the surveillance images and restores and stores the moving images and the still images. When a user requests the display of images, the surveillance image reception unit 50 outputs the moving images and the still images. Particularly, when the surveillance image reception unit 50 receives a signal from a user requesting the output of a still image during the output of a moving image, the surveillance image receiving unit 50 outputs the still image of the frame nearest the moving image currently being output. The detailed operation of the surveillance image transmission unit 40 and the surveillance image reception unit 50 will be described in more detail with reference to FIGS. 4 and 5.

Since a still image has high resolution, the still image is output more clearly than a moving image. Therefore, the user can clearly view a scene by requesting a still image corresponding to the scene that cannot be clearly viewed through a moving image. The surveillance image reception unit 50 receives key input requesting a still image while outputting a moving image in a surveillance image form. A keypad button in a separate input unit may be provided, or a cursor, which enables a user to select a still image, may be provided on a screen. For example, the moving image has a resolution of 640 bytes×480 bytes, and is composed of about 30 frames per second. The still image has a high resolution of 1280 bytes× 960 bytes. When the still image is acquired during the output of the moving image, the resolution of the screen for the still image is decreased, so that the sharpness of the screen is low. Thus, the security surveillance system according to the present embodiment generates and stores one still image per 30 moving image frames. Since 30 moving image frames are arranged within a second interval, the single still image frame can be inserted into the moving image at intervals of about one second. The interval may be set by the user or have a predetermined value, so that it is variable.

Detailed descriptions of the surveillance image transmission unit 40 and the surveillance image reception unit 50 of FIG. 3 will be described in more detail below with reference to FIGS. 4 and 5.

Figure 4:
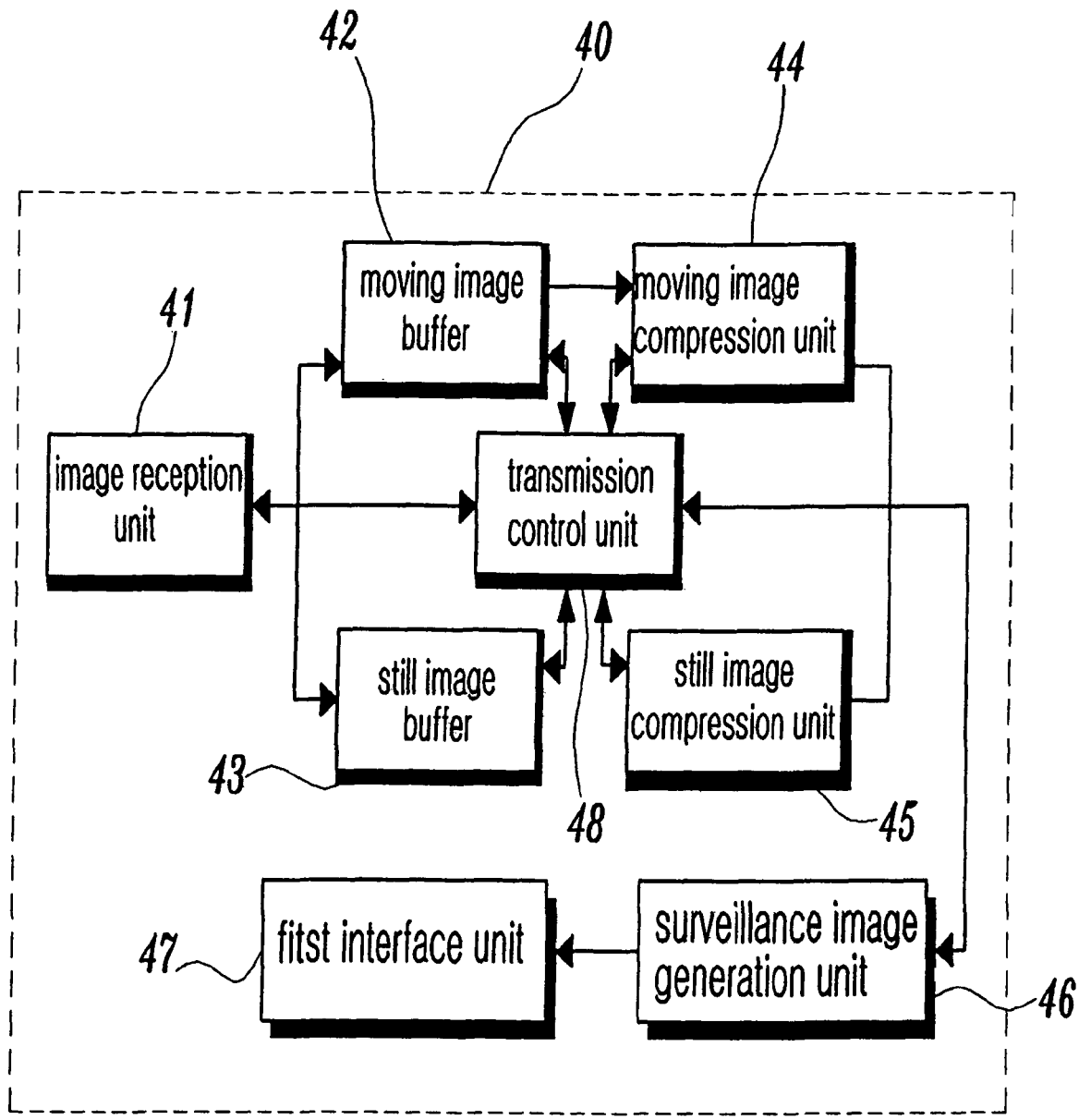
FIG. 4 is a detailed block diagram showing the surveillance image transmission unit of FIG. 3.

FIG. 4 is a detailed block diagram showing the surveillance image transmission unit of FIG. 3.

Referring to FIG. 4, the surveillance image transmission unit 40 includes an image reception unit 41 for receiving images from cameras, a moving image buffer 42 for storing the received moving images, a still image buffer 43 for storing still images at regular intervals, a moving image compression unit 44 for receiving and compressing the moving images stored in the moving image buffer 42, a still image compression unit 45 for receiving and compressing the still images stored in the still image buffer 43, a surveillance image generation unit 46 for packetizing the compressed moving images and the compressed still images for transmission, a first interface unit 47 for transmitting surveillance images, and a transmission control unit 48 for controlling the elements for transmitting the surveillance images.

In FIG. 4, the image reception unit 41 receives and outputs images from the cameras. At this time, the image reception unit 41 outputs the received images to the moving image buffer 42, separates still images from the received images at regular intervals and outputs them to the still image buffer 43. Meanwhile, the transmission control unit 48 sets the regular intervals at which the image reception unit 41 separates the still images, notifies the image receiving unit 41 of the set intervals, and controls the image separation operation of the image receiving unit 41 that are performed at the set intervals. The moving image buffer 42 buffers the received moving images and outputs the moving images to the moving image compression unit 44. The still image buffer 43 buffers the received still images and outputs the still images to the still image compression unit 45. The moving image compression unit 44 compresses and outputs the moving images using MPEG compression or the like, and the still image compression unit 44 also compresses and outputs the still images using Joint Photographic Experts Group (JPEG) compression or the like. The surveillance image generation unit 46 receives the compressed moving images from the moving image compression unit 44 and the compressed still images from the still image compression unit 45. Then, the surveillance image generation unit 46 packetizes the still images and the moving images so that still images are inserted into each of the moving images at the set intervals under the control of the transmission control unit 48, formats the packetized images in conformity with a transmission standard and outputs the formatted images. Thereafter, the first interface unit 47 transmits the surveillance images to the surveillance image reception unit 50. Although the case of wireless transmission is described in this embodiment, wired transmission using an RJ45 jack is possible.

Figure 5:
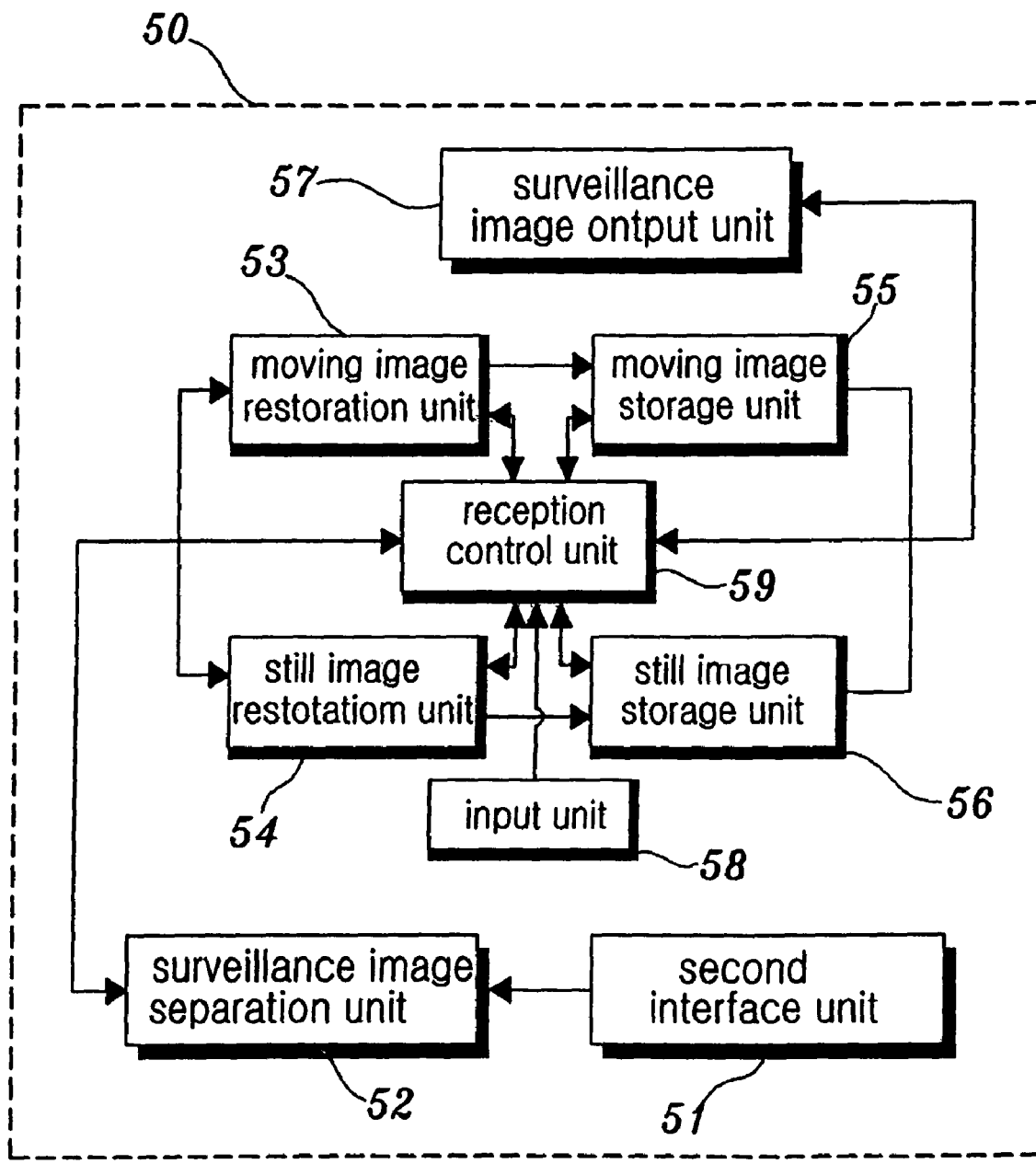
FIG. 5 is a detailed block diagram showing the surveillance image reception unit of FIG. 3.

FIG. 5 is a detailed block diagram showing the surveillance image reception unit of FIG. 3.

Referring to FIG. 5, the surveillance image reception unit 50 includes a second interface unit 51 for receiving the surveillance images from the first interface unit 47 and outputting them, a surveillance image separation unit 52 for separating each of the received surveillance images into still images and a moving image, a moving image restoration unit 53 for receiving and restoring the separated moving images, a still image restoration unit 54 for receiving and restoring the separated still images, a moving image storage unit 55 for storing the restored moving images, a still image storage unit 56 for storing the restored still images, a surveillance image output unit 57 for outputting the still images and the moving images, an input unit 58 for performing key input for selectively outputting the moving images or the still images, and a reception control unit 59 for controlling the above-described elements so as to output the surveillance image in moving image or still image form at the request of the user.

In FIG. 5, the second interface unit 51 receives and outputs the received surveillance images. The surveillance image separation unit 52 separates the formatted packets into the still image packets and the moving image packets and outputs the moving image packets to the moving image restoration unit 53 and the still image packets to the still image restoration unit 54. The moving image restoration unit 53 receives the moving image packets, and restores and outputs the moving images. The still image restoration unit 54 receives the still image packets, and restores and outputs the still images. The moving image storage unit 55 receives the restored moving images from the moving image restoring unit 53 and stores them. The still image storage unit 56 receives the restored still images from the still image storage unit 54 and stores them. The surveillance image output unit 57 outputs the moving images from the moving image storage unit 55 when the user desires to output a still image during the output of a moving image, he or she inputs a signal requesting the output of a still image. When receiving the requesting signal, the reception control unit 59 reads the still image of the frame nearest the currently output moving image from the still image storage unit 56 and outputs the read still image to the surveillance image output unit 57. Then, the surveillance image output unit 57 outputs a still image having high resolution nearest the moving image previously output on the screen, as will be described in detail with reference to FIGS. 6 and 7.

Figure 6:
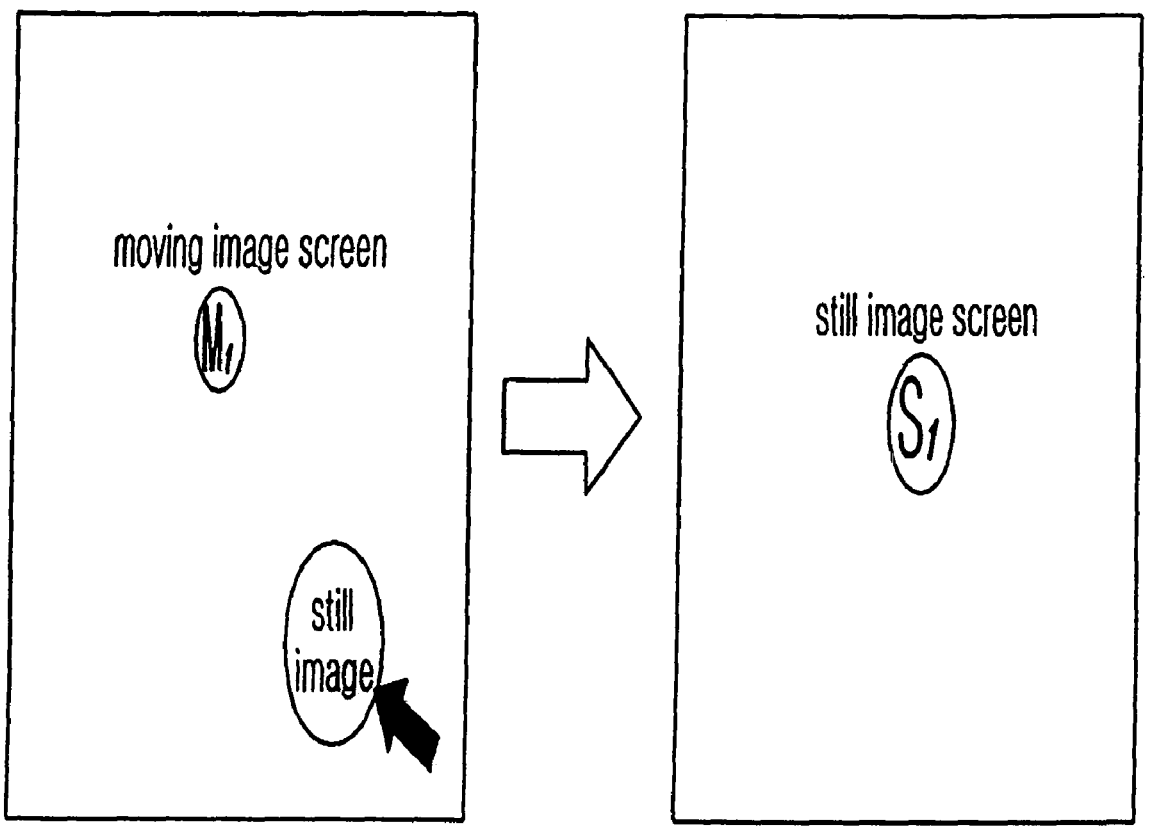
FIG. 6 is a view showing the states of the screen of the security surveillance system according to the present invention.

FIG. 6 is a view showing the states of the screen of the security surveillance system according to the present invention.

Referring to FIG. 6, a moving image screen M1 is displayed on a main screen, and a selection window for selecting the still image is displayed on a side of the main screen. When desiring to view a still image having higher resolution while viewing the moving image screen M1, the user clicks on the selection window for the still image, and the still image screen S1 is then output onto the screen. Since the screen nearest the moving image screen M1 is the still image screen S1, the still image S1 is output. The relationship between the still image screen S1 and the moving image screen M1 can be understood from FIG. 7.

Figure 7:
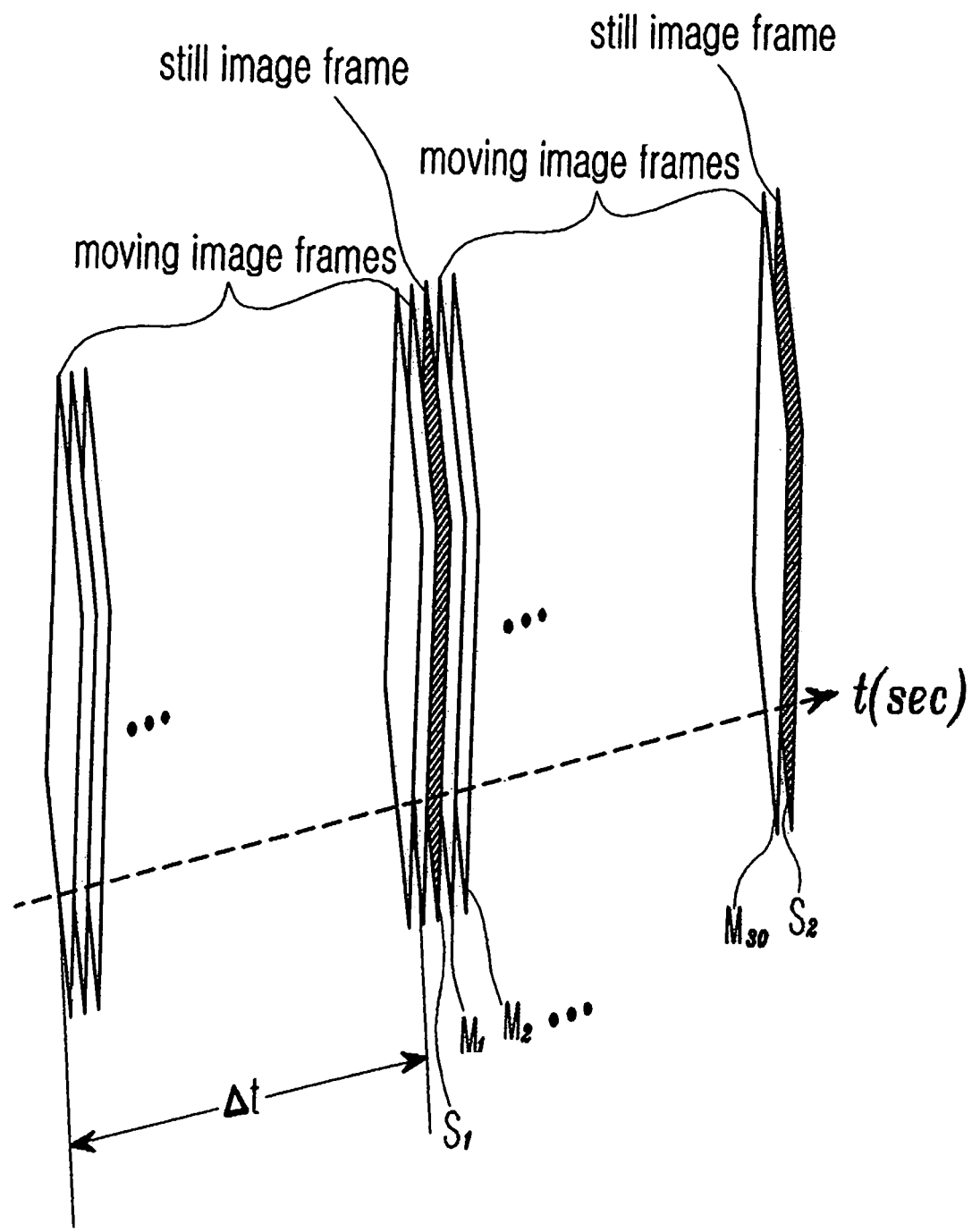
FIG. 7 is a reference view illustrating the relationship between the screens of the security surveillance system according to the present invention.

FIG. 7 is a reference view illustrating the relationship between the screens of the security surveillance system according to the present invention.

Referring to FIG. 7, the moving image frames are arranged along a time axis and the still images frames are arranged between the frames of the moving image at regular intervals. The still image frames are arranged at regular intervals of $\Delta t$, and the regular interval is generally set to one second. $\Delta t$ for the still image frames may be predetermined as described above, or may be set by the user. Between still image frames S1 and S2, moving image frames M1, M2, ..., M30, that is, 30 frames, are arranged. In FIG. 6, when the signal requesting the output of the still image is input by the user during the output of the moving image M1, the reception control unit 59 selects the still image frame S1 nearest the moving image M1 and displays a still image screen. Accordingly, the user can perform security surveillance by viewing the still image nearest the current moving image at the time at which the signal requesting the output of the still image is input.

As a result, the system according to the present invention can provide still images together with moving images at the time of the output of images for security surveillance, thus improving the efficiency of security surveillance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A security surveillance system capable of outputting still images together with moving images, comprising:
   an image acquisition unit for acquiring captured image signals from a plurality of cameras and outputting them;
   a surveillance image transmission unit for separating the acquired images into moving images and still images, and generating and transmitting surveillance images where the still images are separated at predetermined regular intervals; and
   a surveillance image reception unit for separately storing the moving images and the still images, reading a still image near a moving image output at a time when a signal requesting the output of the still image is received, and outputting the read still image, and
   wherein the surveillance image transmission unit comprises:
   an image reception unit for receiving images from the cameras;
   a moving image buffer for storing the received moving images;
   a still image buffer for storing still images at regular intervals;
   a moving image compression unit for receiving and compressing the moving images stored in the moving image buffer;
   a still image compression unit for receiving and compressing the still images stored in the still image buffer;

a surveillance image generation unit for packetizing the compressed moving images and the compressed still images for transmission;

a first interface unit for transmitting packets of the generated surveillance images; and a transmission control unit for controlling the elements for transmitting the surveillance images.

2. The security surveillance system as set forth in claim 1, wherein the transmission control unit sets the intervals at which the image reception unit separates the still images from the received images, notifies the image reception unit of the set intervals, and controls the image reception unit so as to separate the still images at the set intervals.

3. The security surveillance system as set forth in claim 2, wherein the image reception unit packetizes the moving images and the still images so that still images are inserted into each of the moving images at the set intervals, and formats the packetized images in conformity with a transmission standard under the control of the transmission control unit.

4. The security surveillance system as set forth in claim 1, wherein the surveillance image reception unit comprises:

a second interface unit for receiving surveillance images from the surveillance image transmission unit and outputting the received images;

a surveillance image separation unit for separating each of the received surveillance images into still images and a moving image;

a moving image restoration unit for receiving and restoring the separated moving images;

a still image restoration unit for receiving and restoring the separated still images;

a moving image storage unit for storing the restored moving images;

a still image storage unit for storing the restored still images;

a surveillance image output unit for outputting the restored still images and the restored moving images;

an input unit for receiving a signal requesting output of the still image; and a reception control unit for controlling the elements so as to selectively output the moving images or the still images in response to the request signal.

5. The security surveillance system as set forth in claim 4, wherein the reception control unit reads a still image of a frame nearest the moving image currently output from the still image storage unit when the signal requesting output of the still image is input, and outputs the read still image to the surveillance image output unit.

6. The security surveillance system as set forth in claim 5, wherein the still image has higher resolution than the moving image.

* * * * *